(12) United States Patent
Hammon et al.

(10) Patent No.: US 10,239,033 B2
(45) Date of Patent: Mar. 26, 2019

(54) REACTOR SYSTEM AND USE THEREOF

(71) Applicant: BASF SE, Ludwigshafen (DE)

(72) Inventors: Ulrich Hammon, Mannheim (DE); Thomas Walter, Hassloch (DE)

(73) Assignee: BASF SE, Ludwigshafen (DE)

( * ) Notice: Subject to any disclaimer, the term of this patent is extended or adjusted under 35 U.S.C. 154(b) by 545 days.

(21) Appl. No.: 14/659,753

(22) Filed: Mar. 17, 2015

(65) Prior Publication Data

US 2015/0266000 A1    Sep. 24, 2015

Related U.S. Application Data

(60) Provisional application No. 61/954,663, filed on Mar. 18, 2014.

(30) Foreign Application Priority Data

Mar. 18, 2014 (DE) .................. 10 2014 103 694

(51) Int. Cl.
   *B01J 8/06* (2006.01)
   *B01J 19/24* (2006.01)
   *B01J 19/00* (2006.01)

(52) U.S. Cl.
   CPC .......... *B01J 8/067* (2013.01); *B01J 19/0013* (2013.01); *B01J 19/24* (2013.01); *B01J 19/2425* (2013.01); *B01J 2208/00176* (2013.01); *B01J 2208/00256* (2013.01); *B01J 2219/00081* (2013.01); *B01J 2219/00094* (2013.01); *B01J 2219/00103* (2013.01); *B01J 2219/24* (2013.01)

(58) Field of Classification Search
   CPC .............. B01J 8/067; B01J 2008/00256; B01J 2008/00176
   See application file for complete search history.

(56) References Cited

U.S. PATENT DOCUMENTS

| 7,988,927 B2 * | 8/2011 | Lehr ........................ B01J 8/067 165/104.21 |
| 2008/0023175 A1 | 1/2008 | Lehr et al. |
| 2013/0056081 A1 | 3/2013 | Wortmann et al. |

FOREIGN PATENT DOCUMENTS

| DE | 2 207 166 A1 | 9/1973 |
| DE | 10 2006 034 811 A1 | 1/2008 |

(Continued)

OTHER PUBLICATIONS

International Search Report and Written Opinion dated Jun. 8, 2015 in PCT/EP2015/054961 (with English translation of categories of cited documents).

(Continued)

*Primary Examiner* — Lessanework Seifu
(74) *Attorney, Agent, or Firm* — Oblon, McClelland, Maier & Neustadt, L.L.P.

(57) ABSTRACT

A reactor system (1) having a reactor 3, at least one cooler (5) connected to the reactor (3), at least one pump (7) for circulating at least some of a liquid heat-transfer medium (9), wherein the pump (7) is connected to the reactor (3) and/or the at least one cooler (5), and a container (11) for collecting the liquid heat-transfer medium (9) is provided. The container (11) is connected to the reactor (3) and/or the at least one cooler (5) and is disposed substantially below the reactor (3) and/or the at least one cooler (5). Also provided are exothermic reactions which are conducted in the reactor system.

9 Claims, 1 Drawing Sheet

(56) References Cited

FOREIGN PATENT DOCUMENTS

| | | |
|---|---|---|
| JP | 56-97298 U | 8/1981 |
| JP | 60-68047 A | 4/1985 |
| JP | 2008-30033 A | 2/2006 |
| WO | WO 2004/090066 A1 | 10/2004 |
| WO | WO 2008/136681 A1 | 11/2008 |

OTHER PUBLICATIONS

U.S. Appl. No. 14/737,025, filed Jun. 11, 2015, Hammon, et al.
Office Action dated Aug. 21, 2017 in Japanese Patent Application No. 2016-558127 (English translation only).

* cited by examiner

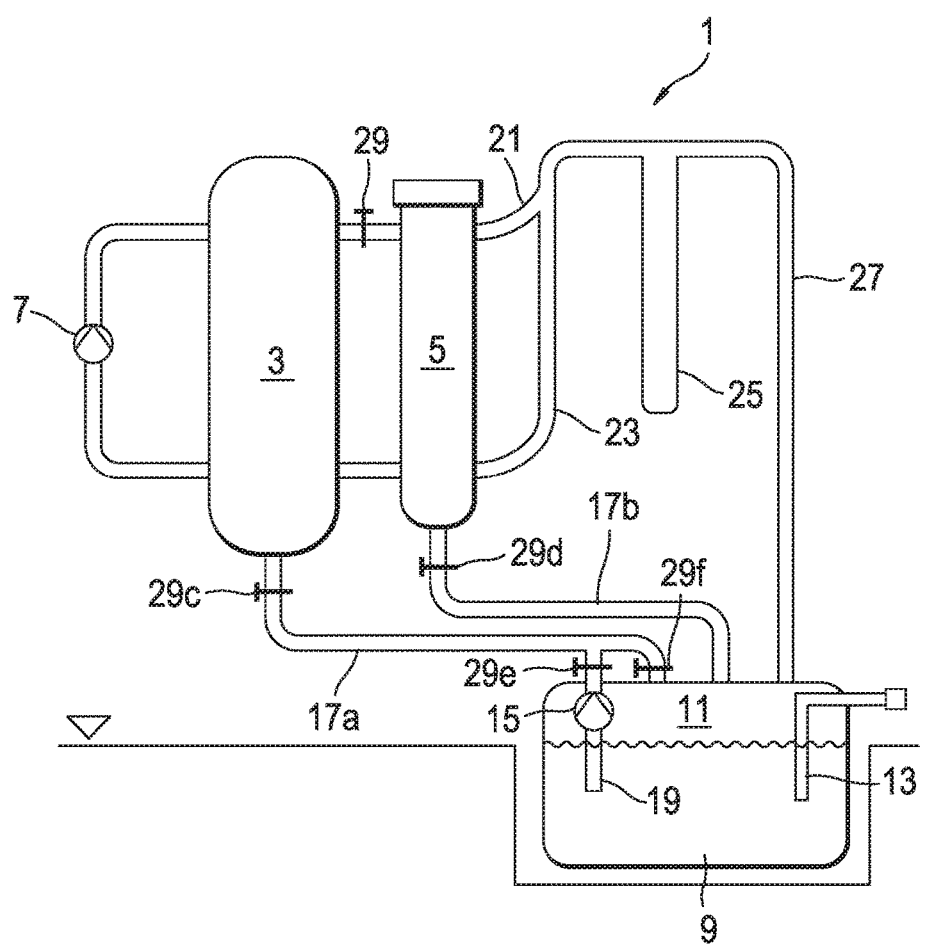

REACTOR SYSTEM AND USE THEREOF

This application claims the benefit of pending U.S. provisional patent application Ser. No. 61/954,663 and DE patent application Serial Number 10 2014 103 694.8, both filed on Mar. 18, 2014, incorporated in its entirety herein by reference.

The present invention relates to a reactor system comprising a reactor, at least one cooler connected to the reactor, and at least one pump which provides pumped circulation of the liquid heat-transfer medium through the reactor and the at least one cooler.

Reactor systems of the type in question are, in principle, known from the prior art.

Thus, DE 22 07 166 A1 describes a reactor system comprising a cooling assembly for reaction apparatuses comprising a recirculating heat-transfer medium, wherein a circulation pump and a cooler are disposed outside a reaction vessel for said heat-transfer medium. Therein, the circulation pump and the cooler are accommodated in two housings arranged side-by-side. Furthermore, an expansion vessel for the heat-transfer medium is disposed above and in communication with the pump housing and a vapor separator for the coolant is disposed directly above the cooler housing and in communication with the cooler tubes.

In connection with a method for varying the temperature of a shell-and-tube reactor, DE 10 2006 034 811 A1 describes a reactor system comprising a salt bath cooler with no specific restrictions on its cooling medium. The cooler has an equalization vessel with a fill-level gauge disposed therein.

WO 2004/090066 A1 discloses the use of an ionic liquid which in a particularly preferred embodiment is used for indirect supply or removal of heat from a shell-and-tube reactor. Therein is described a shell-and-tube reactor consisting of a cylindrical container in which a bundle of reaction tubes is accommodated in a vertical arrangement. These reaction tubes, which can optionally contain supported catalysts, have their ends sealedly fixed into tube plates and open into one cap connected to the container at the top end and one cap connected to the container at the bottom end. The reaction mixture flowing through the reaction tubes is supplied and removed via the caps. A circulating heat-transfer medium is passed through the space surrounding the reaction tubes in order to equalize the thermal balance, in particular for reactions evolving a large amount of heat. In the shell-and-tube reactors described, a largely homogeneous temperature distribution of the heat-transfer medium is realized in each horizontal section through the reactor in order ideally to involve all reaction tubes equally in the reaction. Furthermore, the reactor can incorporate deflection plates which alternately leave free part of the reactor cross section in the middle of the reactor and at the edge of the reactor.

It is a disadvantage of the known reactor systems that reservoir containers for heat-transfer media are disposed inside the plant concerned and are generally located at the same height at ground level, since both the reactor and the collection vessel can weigh several hundred metric tons. Cooling down the reactor, for example in the course of changing the catalyst or for repair or maintenance, requires removing the heat-transfer medium from the reactor beforehand, since otherwise the freezing heat-transfer medium could, in particular on heating up again, give rise to stresses inside the reactor and damage the reactor. The heat-transfer medium concerned needs to be pumped into the elevated container for storage or the salt space of the reactor needs to be pressurized with gas, resulting in high construction complexity. In addition, leakage of the container would be hazardous to human health and the environment due to the relatively high temperature and the oxidizing action of the escaping heat-transfer medium.

In view of these disadvantages of the prior art, it is an object of the present invention to provide an improved reactor system which overcomes the disadvantages mentioned. It is in particular an object of the present invention to provide a reactor system which ensures safe handling of a liquid heat-transfer medium.

The abovementioned object is achieved in a first aspect of the invention by a reactor system (1) comprising
 a reactor (3),
 at least one cooler (5) connected to the reactor (3),
 at least one pump (7) for circulating at least some of a liquid heat-transfer medium (9), wherein the pump (7) is connected to the reactor (3) and/or the at least one cooler (5), and
 a container (11) for collecting the liquid heat-transfer medium (9), wherein the container (11) is connected to the reactor (3) and/or the at least one cooler (5), wherein the container (11) is disposed below the reactor (3) and/or the at least one cooler (5).

The reactor system according to the invention is, in particular, notable in that the liquid heat-transfer medium (9) can be drained easily.

In a second aspect of the invention, the object is achieved by the use of the reactor system (1) according to the invention and as defined above, for carrying out exothermic reactions.

The invention is described in more detail hereinbelow.

The invention firstly provides a reactor system (1) comprising a reactor (3), at least one cooler (5) connected to the reactor (3), at least one pump (7) for circulating at least some of a liquid heat-transfer medium (9), wherein the pump (7) is connected to the reactor (3) and/or the at least one cooler (5), and a container (11) for collecting the liquid heat-transfer medium (9), wherein the container (11) is connected to the reactor (3) and/or the at least one cooler (5). The container (11) is disposed below the reactor (3) and/or the at least one cooler (5).

Arranging the container (11) below the reactor (3) and/or the cooler (5) has the initial advantage that the liquid heat-transfer medium (9) can be drained from the plant easily, since the liquid heat-transfer medium (9) flows into the container (11) under its hydrostatic pressure. Furthermore, the liquid heat-transfer medium (9) drained from the reactor system (1) is not stored in an elevated tank as in the prior art but rather in a lower-lying container (11) and therefore the liquid heat-transfer medium (9) poses little, if any, hazard to human health and the environment. To this end, the container (11) is preferably installed in a pit integrated into the foundation slab. The lower-lying arrangement of the container (11) has the additional advantage that the reactor system (1) need not be built upward in order to accommodate the container (11). The pit has the advantage that in the event of leakage, the escaping heat-transfer medium (9) can be safely contained.

For the purposes of the present invention, the wording "below" is to be construed as meaning that the container (11) is disposed relative to the reactor (3) and/or to the cooler (5) in such a way that the liquid heat-transfer medium (9) can flow into the container (11) on account of its hydrostatic pressure, without the need for additional conveying.

In one development of the reactor system (1) according to the invention, the container (11) comprises a heating apparatus (13) for heating the liquid heat-transfer medium (9). The liquid heat-transfer medium (9) is generally selected from media which are solid or very highly viscous at ambient temperature. The heat-transfer media (9) only become liquid as of a certain temperature, generally above 140° C. In order, then, to prevent the liquid heat-transfer medium (9) from increasing in viscosity or solidifying in the container (11), a heating apparatus (13) is advantageous.

The heating apparatus (13) can be designed such that heating elements are disposed on the exterior of the container (11) in order to heat the heat-transfer medium (9) via the container wall. Additionally or alternatively, one or more heating elements may be present in the container (11) itself. This is advantageous particularly when the container (11) reaches a certain size and heat output introduced via the outer walls of the container (11) is thus no longer sufficient for the liquid heat-transfer medium (9). The heating apparatus (13) can be operated with liquid and/or gaseous media, in particular using steam, or it can be provided with electric heating elements.

It is preferable for the container (11) to be disposed at least partly below ground level. As already addressed hereinabove, the overall construction height of the reactor system (1) can be reduced by the lower-lying arrangement of the container (11). In the present invention, the wording "at least partly below ground level" means that the container (11) is disposed in a depression in the ground, in particular in a pit. Such a depression can be advantageous for the heat insulation of the container (11), since a tank disposed above ground would be subject to weather influences to a greater extent. The depression can also be designed such that it contains the escaping liquid heat-transfer medium (9) in the event of leakage of the container (11), thereby providing protection from hazards to human health and the environment.

In a further embodiment of the present invention, the container (11) further comprises a pump (15) which can be used to recycle the liquid heat-transfer medium (9) in the container (11) to the plant, i.e., to the reactor (3) and/or the at least one cooler (5). This means that the container (11) can serve not only as a containing means for the liquid heat-transfer medium (9) but also as a reservoir vessel and an interim storage means for the liquid heat-transfer medium (9).

It has proved advantageous for the volume of the container (11) to be 10% greater than the volume of the liquid heat-transfer medium (9) theoretically contained in the reactor (3) and/or the cooler (5). The container (11) should be able to collect at least 20% of the liquid heat-transfer medium (9) in the reactor system (1) from the reactor (3) and the at least one cooler (5). However, since the density of the liquid heat-transfer medium generally changes with temperature, it is advantageous to provide a safety margin of at least 10% so as not to expose the container to excessive stress.

In one development, the container (11) can furthermore be connected via outlet lines (17a, 17b) to the lowermost points of the reactor (3) and/or the cooler (5) respectively.

The outlet lines are preferably installed with an incline towards the container (11) and provided with supplementary heating. This arrangement facilitates virtually complete draining of the liquid heat-transfer medium (9) from the reactor (3) and/or the at least one cooler (5) since the liquid heat-transfer medium (9) can (virtually) completely flow out owing to its hydrostatic pressure at the lowermost point.

In order to recycle the liquid heat-transfer medium (9), i.e., to also be able to use the container (11) as a reservoir container, it is advantageous to connect the container (11) to both the reactor (3) and/or the at least one cooler (5) via at least one return line (19). The liquid heat-transfer medium (9) in the container (11) can be pumped back into the reactor (3) and/or the cooler (5) via this line with the aid of the pump (15). The pump (15) is preferably an immersion pump where the drive motor is dry-mounted and the actual pump housing is fully immersed in heat-transfer medium (9).

It has further proved advantageous for the outlet lines (17a, 17b) and/or the return line (19) to each comprise a heating apparatus. This advantageously prevents the liquid heat-transfer medium (9) from decreasing in viscosity in the lines or from solidifying and thus blocking the system.

It is preferable for all lines of the reactor system (1) to be at least partially trace heated.

It is a further advantage of the reactor system (1) according to the invention that the liquid heat-transfer medium (9) does not cool down significantly and need not subsequently be heated up again. This saves energy. This also avoids damage in or to the reactor system (1) which may occur when the liquid heat-transfer medium (9) becomes highly viscous or solid with an attendant change in density. This applies particularly to the pump (7) and the lines (17a, 17b, 19).

In a preferred embodiment of the reactor system (1), the reactor (3) is a shell-and-tube reactor for carrying out exothermic reactions. Alternatively or additionally, in this embodiment the cooler (5) can be a salt bath cooler and the liquid heat-transfer medium (9) can be a salt melt.

The salt melt is preferably a mixture of alkali metal nitrates and alkali metal nitrites. A particularly preferred salt mixture consists of 53 wt % of potassium nitrate, 40 wt % of sodium nitrite and 7 wt % of sodium nitrate. This combination forms a eutectic mixture with a melting point of about 142° C. The operating temperature of this salt bath is between 200° C. and 500° C.

The present invention is applicable to heat-transfer oils as well as to a liquid heat-transfer medium (7) in the form of a salt melt. However, these heat-transfer oils are generally limited to a maximum operating temperature of 250° C. to 280° C. which is insufficient for controlling the temperature of many reactions, for example in shell-and-tube reactors.

In a further aspect of the present invention, the use of the reactor system (1), as described above, is used to carry out exothermic reactions.

The removal of the heat of reaction from exothermic reactions presents a substantial challenge. To this end, use is made of reactor systems of the type in question wherein the heat of reaction is removed from a reactor via a liquid heat-transfer medium. The liquid heat-transfer medium heated up by the heat of reaction is cooled down in a connected cooler and the energy liberated there is used for steam generation for example. Use of the reactor system (1) according to the invention has proved advantageous for compensating for variability in the removal of heat of reaction.

Further objectives, features, advantages and possible applications are evident from the following description of working examples of the present invention with reference to the figures. All features described and/or illustrated by figures, alone or in any combination, form the subject matter of the present invention, irrespective of their combination in the claims or the claims to which they refer back.

FIG. 1 shows a schematic diagram of a reactor system 1 in one embodiment of the invention.

FIG. 1 is a schematic diagram of a preferred embodiment of the reactor system 1 according to the invention. The reactor system 1 comprises a reactor 3 connected to a cooler 5. A pump 7 circulates at least some of the liquid heat-transfer medium 9 through the reactor 3 and the cooler 5. The pump 7 is, in particular, a circulation pump.

The cooler 5 comprises an emergency relief port 21 and a safety device 23 so as to be able in case of rising pressure of liquid heat-transfer medium 9 to effect discharge thereof into the container 11 via a line 27, thereby relieving the pressure on the reactor housing.

The reactor system 1 according to the invention has an essentially unpressurized design. In this case, unpressurized means that no precautionary measures for pressures of more than 5 bar need be taken. The reactor 3 and the cooler 5 are of course designed for this pressure which is exerted, for example, by the pump 7 and the hydrostatic pressure of the heat-transfer medium 9. However, higher pressures are not generated according to the invention and are, in particular, prevented by the safety device 23.

The cooler 5 is advantageously flanged or welded to the reactor 3. The control valve 29 is used to adjust the temperature of the reactor by controlling the flow of the heat-transfer medium through the cooler. This embodiment relates, in particular, to shell-and tube reactors in which a bundle of vertically aligned reaction tubes is disposed between two tube plates. The reaction tubes can be packed with a bed of catalyst material (fixed-bed catalyst) depending on the application. The liquid heat-transfer medium 9 which absorbs and dissipates the heat generated during the exothermic reaction flows around the reaction tubes. The constant reaction conditions are provided by, at a predetermined temperature, the heat-transfer medium 9 being circulated for cooling purposes using a pump 7.

It may, for example, be necessary that the catalyst in the reactor tubes needs to be replaced after a certain operating time. The reactor needs to be cooled down to enable the replacement to be performed. In order not to damage the reactor 3 on heating up again, at least 20% of the heat-transfer medium content needs to be removed. However, it is preferable to remove all of the heat-transfer medium 9 in order to minimize the time required for the cooling down and heating up again of the heat-transfer medium 9 remaining in the reactor 3.

For draining purposes, the lowermost point of the reactor 3 and, likewise, the lowermost point of the cooler 5 are provided with an outlet line 17a, 17b leading into the container 11 according to the invention. The outlet lines 17a, 17b at the lowermost point of the reactor 3 and the cooler 5 respectively are advantageously also provided with shutoff valves 29c, 29d. The shutoff valves 29c and 29d are mounted very close to the reactor housing and the cooler housing respectively. Draining the liquid heat-transfer medium causes it to flow into the container 11 which, in the embodiment shown in FIG. 1, is disposed partly below ground level in a pit. The embodiment shows a container 11 having an interiorly disposed heating apparatus 13 which is operated using steam for example. In this embodiment, a pump 15 which can recycle the liquid heat-transfer medium 9 via a return line 19 is disposed in the container 11. The pump 15 is, in particular, a conveyor pump. Here too it is advantageous to provide a shutoff valve 29e. The shutoff valve 29f is in the closed position when the heat-transfer medium 9 is conveyed into the reactor system 1. The valve 29f is in the open position when the heat-transfer medium 9 is to circulate in the container 11 for the purposes of heat equilibration.

Although not shown in FIG. 1, it can be advantageous to additionally provide container 11 with a stirrer in order to agitate the liquid heat-transfer medium 9, thus ensuring an even temperature distribution.

FIG. 1 shows a configuration of the reactor system 1 wherein the return line 19 opens into the outlet lines 17a, 17b and the outlet lines 17a, 17b therefore also serve, in part, to recycle the liquid heat-transfer medium 9. The invention is not, however, limited thereto. It is equally possible for the return line 19 to lead directly into the reactor 3 and/or the cooler 5 as a separate line.

The embodiment shown in FIG. 1 further comprises a separator 25 arranged downstream of the safety device 23, and a pipe 27. The separator is intended to collect the liquid contained in the safety device 23 in the case of a cooler leak when there is ingress of steam into the heat-transfer medium 9 and said heat-transfer medium 9 is decompressed into the container via the safety device 23. This means that the pressure building up in the pipe system (safety device 23+pipe 27) is reduced and rapid relief of the stress on the reactor housing is achieved. Furthermore, the escaping heat-transfer medium is collected in container 11 via the pipe 27 and separated by gravitational separation from the steam which has permeated the heat-transfer medium 9 via the point of leakage. In this case, the heat-transfer medium 9 escaping in the case of leakage can be safely contained, separated from the steam and recycled to the reactor 3 once the cooler 5 has been repaired.

The invention claimed is:

1. A reactor system, comprising:
    a reactor;
    at least one cooler connected to the reactor;
    at least one pump for circulating at least some of a liquid heat-transfer medium, wherein the pump is connected to the reactor or the at least one cooler; and
    a container for collecting the liquid heat-transfer medium, wherein the container is connected to the reactor or the at least one cooler,
    wherein
    the container is connected via outlet lines to a lowermost point of the reactor or the at least one cooler, respectively,
    the container is disposed below the reactor or the at least one cooler, and at least partly below ground level, and
    a volume of the container is 10% greater than a volume of the liquid heat-transfer medium theoretically contained in the reactor and the at least one cooler.

2. The reactor system according to claim 1, wherein the container comprises a heating apparatus for heating the liquid heat-transfer medium.

3. The reactor system according to claim 1, wherein the container further comprises a pump.

4. The reactor system according to claim 1, wherein the container is connected to both the reactor and the at least one cooler via at least one return line.

5. The reactor system according to claim 4, wherein the outlet lines or the return line each comprise a heating apparatus.

6. The reactor system according to claim 1, wherein
    the reactor is a shell-and-tube reactor for carrying out exothermic reactions or
    the at least one cooler is a salt-bath cooler and the liquid heat-transfer medium is a salt melt.

7. A method for an exothermic reaction, the method comprising:
    carrying out the exothermic reaction in the reactor system according to claim 1.

8. The reactor system according to claim 1, wherein the cooler comprises an emergency relief port and a safety device.

9. The reactor system according to claim 8, further comprising a separator arranged downstream of the safety device and a pipe.

* * * * *